United States Patent
Chen

(10) Patent No.: US 7,467,442 B2
(45) Date of Patent: Dec. 23, 2008

(54) HOSE CLAMP

(76) Inventor: Dian-Tai Chen, No. 12, Alley 63, Lane 588, Wenchang Rd., Sec. 2, Yungshun Tsun, Tatu Hsiang, Taichung County (TW)

( * ) Notice: Subject to any disclaimer, the term of this patent is extended or adjusted under 35 U.S.C. 154(b) by 115 days.

(21) Appl. No.: 11/783,122

(22) Filed: Apr. 6, 2007

(65) Prior Publication Data

US 2008/0244876 A1    Oct. 9, 2008

(51) Int. Cl.
*B65D 63/00* (2006.01)
*F16L 33/08* (2006.01)

(52) U.S. Cl. .......................... 24/281; 24/274 R; 24/280; 24/282; 24/279

(58) Field of Classification Search .................. None
See application file for complete search history.

(56) References Cited

U.S. PATENT DOCUMENTS

| | | | | |
|---|---|---|---|---|
| 3,604,074 A | * | 9/1971 | Bambas | 24/274 R |
| 3,900,932 A | * | 8/1975 | Allert | 24/274 R |
| 3,950,830 A | * | 4/1976 | Duprez | 24/274 R |
| 4,099,304 A | * | 7/1978 | Luc | 24/274 R |
| 4,257,149 A | * | 3/1981 | Sydendal | 24/274 R |
| 4,473,928 A | * | 10/1984 | Johnson | 24/483 |
| 5,315,737 A | * | 5/1994 | Ouimet | 24/274 R |
| 5,473,798 A | * | 12/1995 | Baumann et al. | 24/274 R |
| 5,560,087 A | * | 10/1996 | Marques | 24/274 R |
| 5,787,555 A | * | 8/1998 | Chen | 24/274 R |
| 5,956,817 A | * | 9/1999 | Chen | 24/274 R |

\* cited by examiner

*Primary Examiner*—Jack W. Lavinder
(74) *Attorney, Agent, or Firm*—Rosenberg, Klein & Lee

(57) ABSTRACT

A hose clamp includes a binding belt, which has a recess and a protruding portion respectively disposed at front and back sides of one end thereof, a plurality of through holes disposed around the recess, and a plurality of retaining portions in communication with the through holes, and a screw holder, which holds a screw for joining the ends of the binding belt and, which has two mounting plates respectively stopped at two sides of the protruding portion and fastened to the through holes of the binding belt and a plurality of locating rods respectively extended from two sides of each mounting plate and respectively fastened to the retaining portions.

2 Claims, 3 Drawing Sheets

HOSE CLAMP

BACKGROUND OF THE INVENTION

1. Field of the Invention

The present invention relates to a hose clamp for fastening a hose to a pipe and more particularly, to a high-strength hose clamp, which is durable in use.

2. Description of the Related Art

FIGS. 1 and 2 show a hose clamp according to the prior art. According to this design, the hose clamp comprises a binding belt 10, and a screw holder 12 holding a screw 15. The binding belt 10 has a through hole 11 in the flat head thereof. The screw holder 12 has two mounting plates 13 respectively fastened to the side notches on the flat head at two sides of the through hole 11 of the binding belt 10, and locating rods 14 respectively extended from the mounting plates 13 at two sides and inserted through the through hole 11 from the back side toward the front side and then respectively clamped on the front surface of the flat head of the binding belt 10 in four corners around the through hole 11. This design of hose clamp is still not satisfactory in function because of the following drawbacks:

1. The through hole 11 is a big hole that weakens the structural strength of the flat head of the binding belt 10. Therefore, the flat head of the binding belt 10 may be deformed or damaged easily during installation.

2. When rotating the screw 15 to fasten up the hose clamp, the torsional force thus produced may cause the mounting plates 13 to deform and to disengage from the side notches of the flat head of the binding belt 10.

SUMMARY OF THE INVENTION

The present invention has been accomplished under the circumstances in view. It is the main object of the present invention to provide hose clamp, which has a high strength and is durable in use.

To achieve this and other objects of the present invention, the hose clamp comprises a binding belt, and a screw holder mounted with a screw.

The binding belt has a recess and a protruding portion respectively disposed at front and back sides of one end thereof, a plurality of through holes disposed around the recess, and a plurality of retaining portions in communication with the through holes. The screw holder comprises two mounting plates symmetrically disposed at two sides and respectively stopped at two sides of the protruding portion and fastened to the through holes of the binding belt, and a plurality of locating rods respectively extended from two sides of each mounting plate and respectively fastened to the retaining portions.

DETAILED DESCRIPTION OF THE PREFERRED EMBODIMENT

Figure 1:
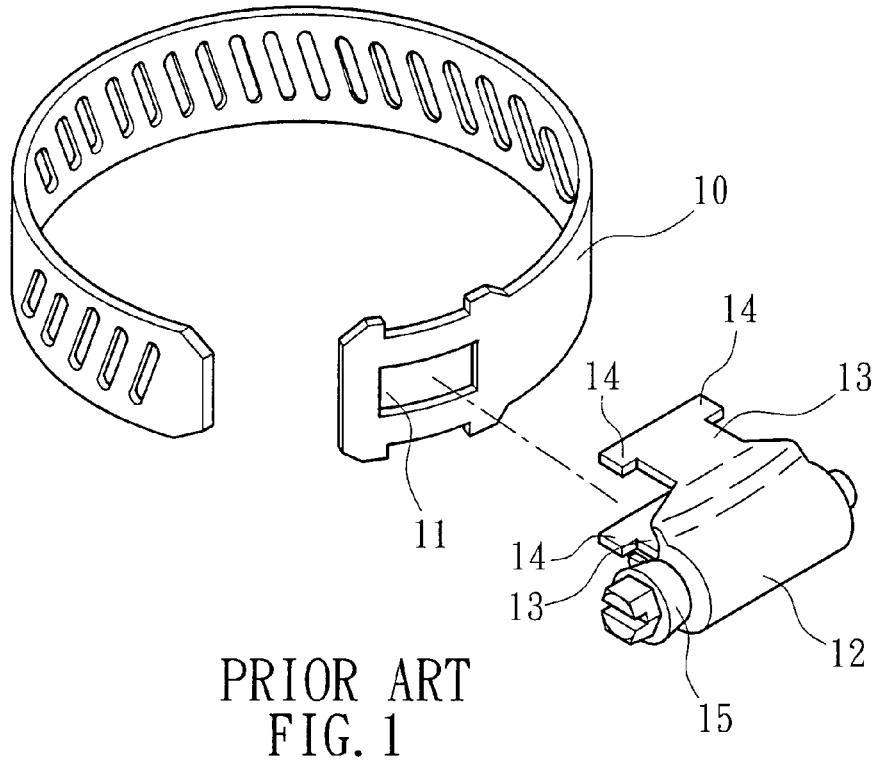
FIG. 1 is an exploded view of a hose clamp according to the prior art.
Figure 2:
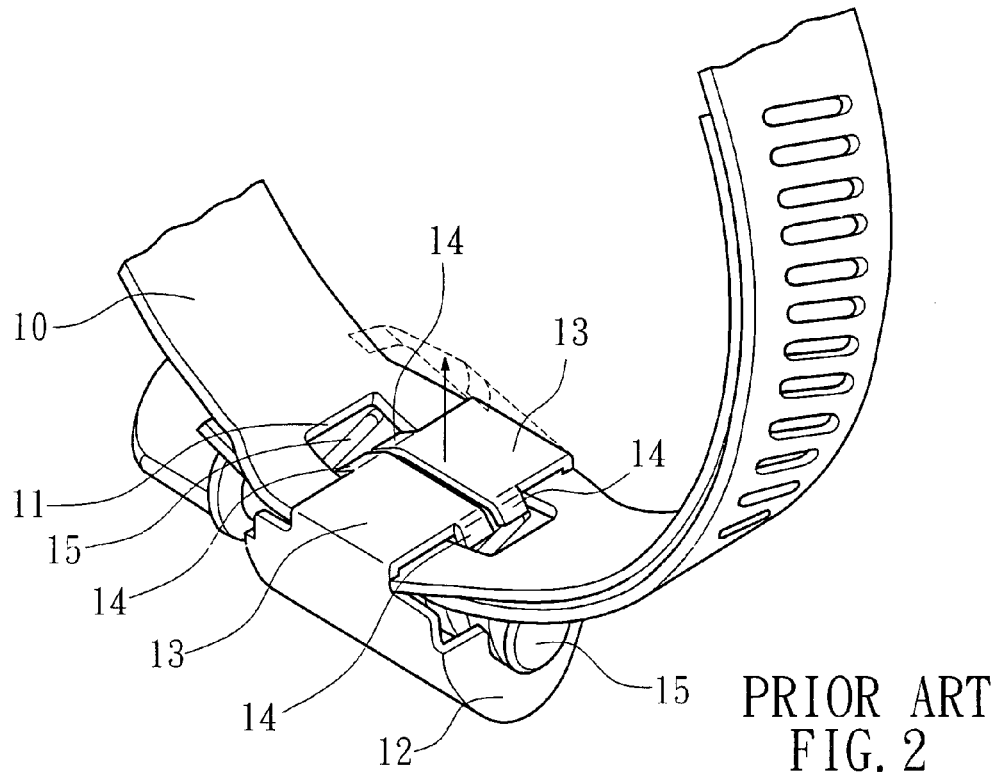
FIG. 2 is an assembly view in an enlarged scale of the hose clamp according to the prior art.
Figure 3:
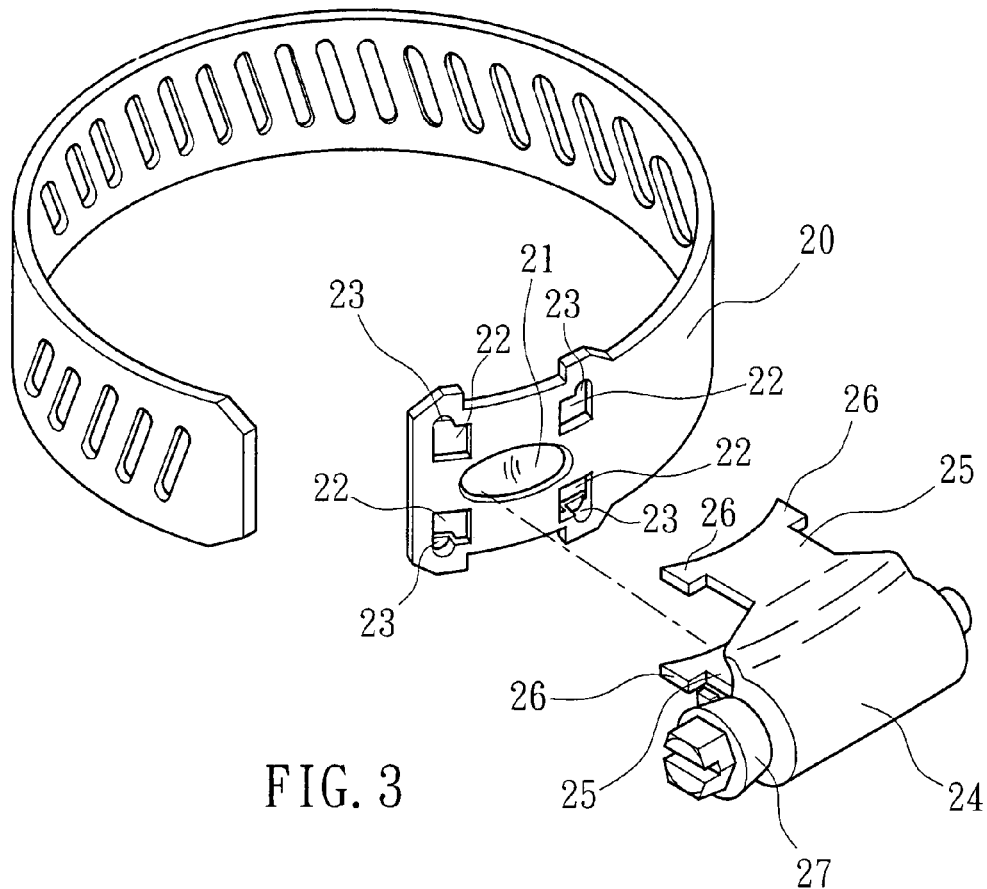
FIG. 3 is an exploded view of a hose clamp according to the present invention.
Figure 4:
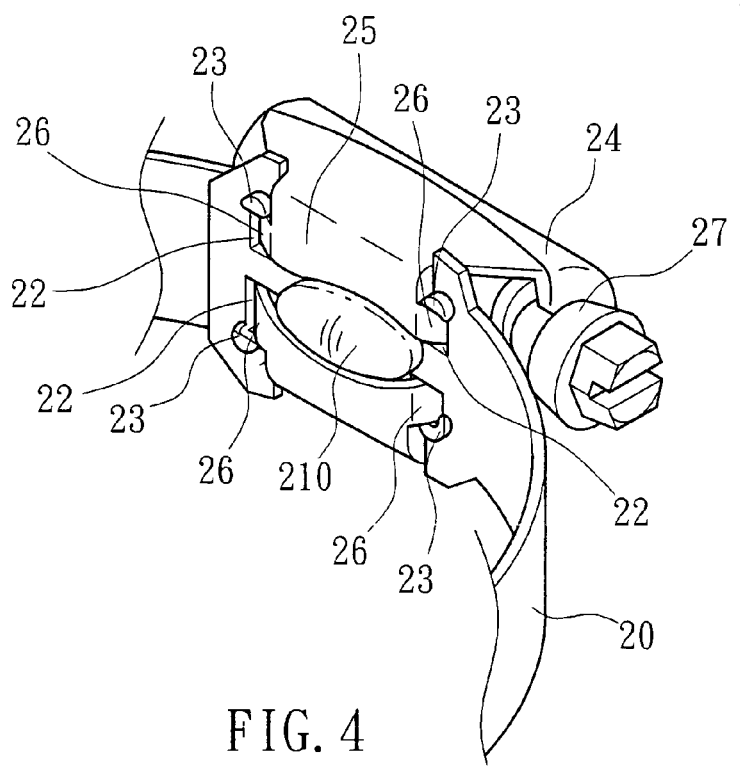
FIG. 4 is an assembly view of a part of the hose clamp according to the present invention.
Figure 5:
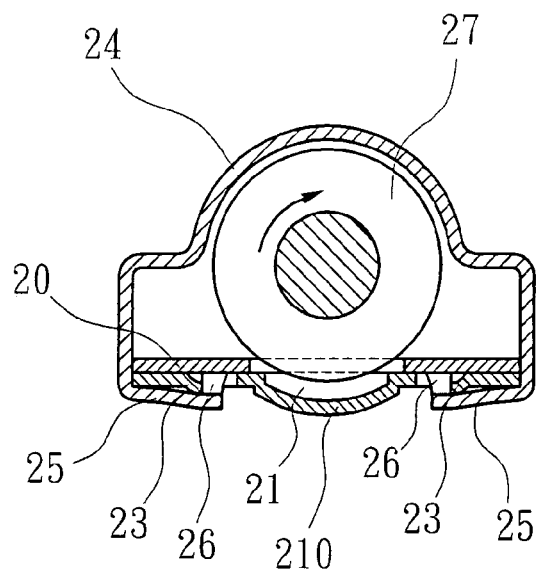
FIG. 5 is a schematic sectional view of the present invention.

Referring to FIGS. 3~5, a hose clamp in accordance with one embodiment of the present invention is shown comprising a binding belt 20, and a screw holder 24 mounted with a screw 27.

The binding belt 20 has a recess 21 on the front side of the head end thereof, a protruding portion 210 at the back side of the head end corresponding to the recess 21, four through holes 22 cut through the front and back sides of the head end in four corners around the recess 21, and four retaining portions 23 respectively disposed in one corner in each of the four through holes 22.

The screw holder 24 comprises two mounting plates 25 symmetrically disposed at two sides, and two pairs of locating rods 26 respectively extended from two sides of the free end of each of the mounting plates 25.

During installation, the screw holder 24 is attached to the top surface of the flat head of the binding belt 20, and then the mounting plates 25 are respectively bent inwards and clamped on the back side of the flat head of the binding belt 20 and stopped at two sides of the protruding portion 210, and the locating rods 26 are respectively inserted into the through holes 22 and forced into engagement with the associating retaining portions 23.

Figure 6:
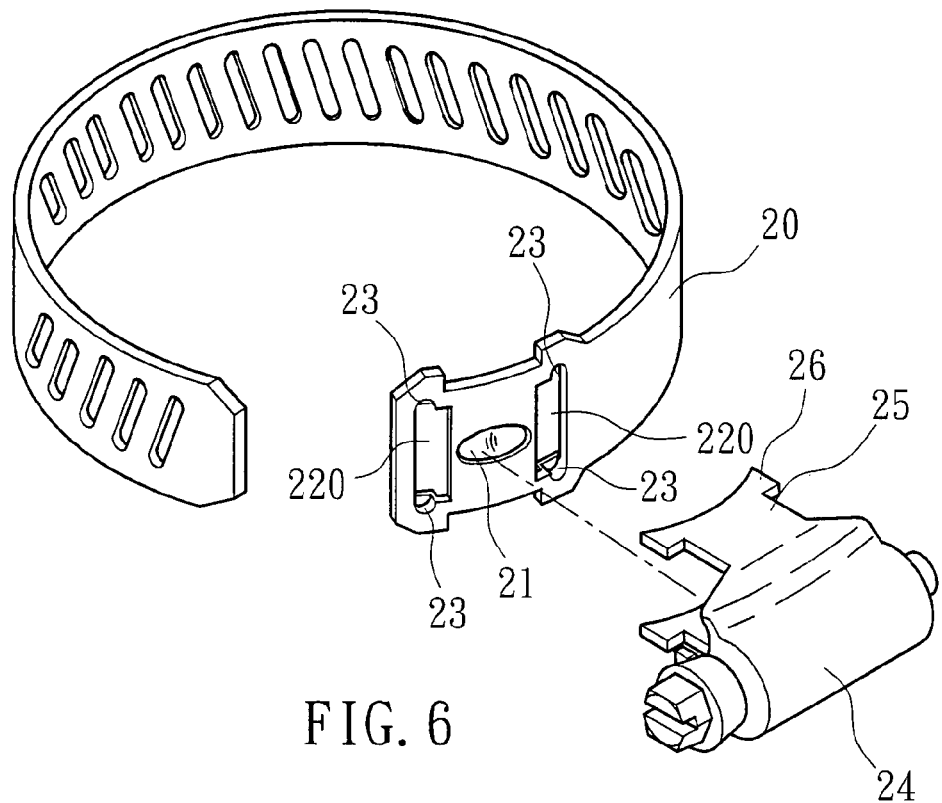
FIG. 6 is an exploded view of an alternate form of the hose clamp according to the present invention.

FIG. 6 shows an alternate form of the hose clamp. According to this embodiment, two elongated through holes 220 are formed on the flat head of the binding belt 20 at two sides of the recess 21 to substitute for the aforesaid four through holes 220, and the four retaining portions 23 are respectively formed at the two ends of each of the elongated through holes 220.

As stated above, the invention provides a hose clamp that has the following features:

1. The recess 21 at the flat head of the binding belt 20 receives a part of the threads of the screw 27 so that the flat head of the binding belt 20 does not interfere with rotation of the screw 27. Further, because the recess 21 does not cut through the front and back sides of the flat head of the binding belt 20, the flat head of the binding belt 20 has a high structural strength and will not wear quickly with the use of the hose clamp.

2. The protruding portion 210 stops the mounting plates 25 in position, enhancing the engagement between the screw holder 24 and the binding belt 20.

3. The four through holes 22 of the binding belt 20 receive the locating rods 26 of the screw holder 24, enhancing the positioning of the screw holder 24 on the flat head of the binding belt 20.

4. The retaining portions 23 of the binding belt 20 receive the locating rods 26 of the mounting plates 25 of the screw holder 24, preventing disconnection of the screw holder 24 from the flat head of the binding belt 20.

A prototype of hose clamp has been constructed with the features of FIGS. 3~6. The hose clamp functions smoothly to provide all the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A hose clamp comprising:

a binding belt, said binding belt having a recess and a protruding portion respectively disposed at front and back sides of one end thereof, and a plurality of through holes around said recess; and a screw holder for joining two distal ends of said binding belt, said screw holder comprising two mounting plates symmetrically disposed at two sides and respectively stopped at two sides of said protruding portion and fastened to the through holes of said binding belt.

2. The hose clamp as claimed in claim 1, wherein said binding belt has four retaining portions respectively disposed in communication with said through holes of said binding belt; said mounting plates each have two pairs of locating rods respectively extended from two sides of each of said mounting plates and respectively fastened to said retaining portions.

* * * * *